(12) United States Patent
Kawai et al.

(10) Patent No.: US 10,423,147 B2
(45) Date of Patent: Sep. 24, 2019

(54) CONTROL DEVICE FOR MACHINE TOOL

(71) Applicant: MAKINO MILLING MACHINE CO., LTD., Tokyo (JP)

(72) Inventors: Rie Kawai, Aiko-gun (JP); Hideki Heishi, Aiko-gun (JP); Kenichi Ono, Aiko-gun (JP)

(73) Assignee: MAKINO MILLING MACHINE CO., LTD., Tokyo (JP)

( * ) Notice: Subject to any disclaimer, the term of this patent is extended or adjusted under 35 U.S.C. 154(b) by 335 days.

(21) Appl. No.: 15/509,742

(22) PCT Filed: Sep. 30, 2014

(86) PCT No.: PCT/JP2014/076222
§ 371 (c)(1),
(2) Date: Mar. 8, 2017

(87) PCT Pub. No.: WO2016/051544
PCT Pub. Date: Apr. 7, 2016

(65) Prior Publication Data
US 2017/0300035 A1    Oct. 19, 2017

(51) Int. Cl.
G05B 19/4068    (2006.01)
G05B 19/409    (2006.01)
G05B 19/4093    (2006.01)

(52) U.S. Cl.
CPC ....... *G05B 19/4068* (2013.01); *G05B 19/409* (2013.01); *G05B 19/4093* (2013.01);
(Continued)

(58) Field of Classification Search
None
See application file for complete search history.

(56) References Cited

U.S. PATENT DOCUMENTS 4,017,831 A * 4/1977 Tieden ............... G05B 19/4181
340/4.36
5,406,494 A * 4/1995 Schuett ................ G05B 19/41
318/569
(Continued)

FOREIGN PATENT DOCUMENTS

CN    102087516    6/2011
CN    102141793    8/2011
(Continued)

OTHER PUBLICATIONS

International Search Report dated Dec. 22, 2014, directed to International Application No. PCT/JP2014/076222, 2 pages.

*Primary Examiner* — Ramesh B Patel
(74) *Attorney, Agent, or Firm* — Morrison & Foerster LLP

(57) ABSTRACT

This control device for a machine tool is provided with: a display unit that displays information relating to a machine tool; a display control unit that controls the display of the display unit; and a storage unit. A display setting of the display unit that corresponds to an operation of an operator or the condition of the machine tool is stored in advance in the storage unit. The display control unit acquires an operation of the operator or the condition of the machine tool, reads the display setting corresponding to the operation of the operator or the condition of the machine tool from the storage unit, and changes the display of the display unit on the basis of the display setting.

4 Claims, 15 Drawing Sheets

(52) U.S. Cl.
CPC .............. *G05B 2219/35459* (2013.01); *G05B 2219/35472* (2013.01); *G05B 2219/36059* (2013.01)

(56) References Cited

U.S. PATENT DOCUMENTS

| | | | | |
|---|---|---|---|---|
| 5,488,564 | A * | 1/1996 | Ikeda | G05B 19/406 700/174 |
| 5,610,842 | A * | 3/1997 | Seki | G05B 19/4069 345/473 |
| 6,389,325 | B1 * | 5/2002 | Rutkowski | G05B 19/409 318/565 |
| 6,597,142 | B2 * | 7/2003 | Shibukawa | G05B 19/40937 318/567 |
| 7,113,838 | B2 * | 9/2006 | Funk | G05B 19/4065 700/108 |
| 8,744,611 | B2 * | 6/2014 | Bornemann | G05B 19/0426 700/159 |
| 9,802,286 | B2 * | 10/2017 | Nishi | B23Q 17/00 |
| 2005/0171627 | A1 * | 8/2005 | Funk | G05B 19/4065 700/121 |
| 2011/0202166 | A1 * | 8/2011 | Bornemann | G05B 19/0426 700/159 |
| 2011/0208346 | A1 * | 8/2011 | Nagano | G05B 19/409 700/159 |
| 2012/0011972 | A1 * | 1/2012 | Kijima | B23B 23/005 82/148 |

FOREIGN PATENT DOCUMENTS

| | | |
|---|---|---|
| CN | 103273324 | 9/2013 |
| JP | 63-282504 | 11/1988 |
| JP | 2-194403 | 8/1990 |
| JP | 2009-193568 | 8/2009 |
| JP | 2010-277425 | 12/2010 |
| JP | 2013-184283 | 9/2013 |
| WO | 1997/46929 | 12/1997 |
| WO | WO-2012/073368 | 6/2012 |

* cited by examiner

CONTROL DEVICE FOR MACHINE TOOL

CROSS-REFERENCE TO RELATED APPLICATIONS

This application is a U.S. National Stage patent application of International Patent Application No. PCT/JP2014/076222, filed Sep. 30, 2014, which is hereby incorporated by reference in the present disclosure in its entirety.

FIELD OF THE INVENTION

The present invention relates to a control apparatus for a machine tool.

BACKGROUND OF THE INVENTION

In a conventional technique, machine tools are known which relatively move tool with respect to workpieces so as to perform machining such as cutting. In addition, among such machine tools, there is known a machine tool of a numerical control type that designates a path of the tool on the basis of coordinates or the like of a prescribed feed axis and performs machining while moving the tool relative to the workpiece. By moving at least one of the workpiece and the tool according to a command from a control apparatus, the machine tool automatically performs machining while changing a relative position of the tool with respect to the workpiece.

In the machine tool of the numerical control type, a machining program in which the relative position of the tool with respect to the workpiece is set, and tool information or the like is inputted to the control apparatus in advance. The control apparatus for the machine tool performs machining of the workpiece on the basis of such information. An operator needs to set or confirm information on machining such as the machining program. Accordingly, a display part that displays the information on machining is arranged in the machine tool.

Japanese Unexamined Patent Publication No. 2-194403 discloses a numerical control apparatus for a machine tool, which has an operation mode such as a manual operation mode, an automatic operation mode, and a program mode. It is disclosed that the numerical control apparatus displays lists of an operation mode and an operation function of each operation mode in a tree structure, and the operation function of each operation mode can be confirmed or set.

CITATION LIST

Patent Literature 1: Japanese Unexamined Patent Publication No. 2-194403

SUMMARY OF THE INVENTION

The operator who operates the machine tool can input machining conditions or the like while watching the display part before machining of the workpiece. The state of machining or the state of the machine tool is displayed on the display part during machining the workpiece. The operator can continue machining of the workpiece while confirming the machining state of the workpiece or the state of the machine tool. Alternatively, the operator can input inspection conditions of the workpiece after machining, perform inspection, or confirm an inspection result while watching the display part.

In recent years, machine tool functions have progressed, and many functions are provided. Along with the increase of functions of the machine tool, the operation of the machine tool is more complex and difficult. In particular, the number of operation of the machine tool has increased for execution of desired operation, complicating an operation procedure.

In addition, even though the functions and the operation method of one machine tool are well known, the type of the machine tool may change, or a manufacturer may change to a different machine tool. In such a case, it is necessary to learn functions and an operation method again in order to master the machine tool, which may result in greater time and labor. In the numerical control apparatus disclosed in the above-described Japanese Unexamined Patent Publication No. 2-194403, the operation for confirming or setting is necessary after displaying a list of the operation function of the operation mode, and thus the number of operation performed by the operator is not reduced.

The present invention has an object to provide a control apparatus for a machine tool, of which operation method is easy and which reduces the number of operation performed by an operator.

A control apparatus for a machine tool according to the present invention is a control apparatus for a machine tool which moves a tool and a workpiece relatively to each other to machine the workpiece, and which includes a display part that displays information relating to the machine tool, a display control part that controls display on the display part, and a storage part that stores display settings of the display part. The display settings of the display part corresponding to an operation of an operator or a state of the machine tool are stored in advance in the storage part. The display control part obtains the operation of the operator or the state of the machine tool, reads the display setting corresponding to the operation of the operator or the state of the machine tool from the storage part, and changes the display on the display part on the basis of the display setting.

In the above invention, the operation mode for driving the machine tool can be preset, and when an operator switches the operation mode, the display control part can read the display setting corresponding to the operation mode from the storage part, and change the display on the display part on the basis of the display setting.

In the above invention, the operation mode can include an edit mode that enables edit of a machining program, and when the operator switches from the operation mode other than the edit mode to the edit mode, the display control part can change the display on the display part to a program edit screen that enables edit of the machining program.

In the above invention, the operation mode can include a trial operation mode for inputting a test program and performing a trial operation of the machine tool, and when the operator switches from the operation mode other than the trial operation mode to the trial operation mode, the display control part can change the display on the display part to a program edit screen that enables edit of the test program.

In the above invention, the operation mode can includes a manual operation mode for manually driving the machine tool, and when the operator switches from the operation mode other than the manual operation mode to the manual operation mode, the display control part can change the display on the display part to a manual operation screen for manually driving the machine tool.

In the above invention, the control apparatus for the machine tool further includes a manual pulse generator that transmits a pulse signal for manually driving the machine tool. The manual pulse generator can include a permission button that enables the pulse signal to be transmitted while being pressed, and in a state in which the manual operation mode is selected, when the operator presses the permission button during the period when a screen other than the manual operation screen is displayed on the display part, the display control part can change the display on the display part to the manual operation screen.

In the above invention, an information display area for displaying a notification image that notifies the state of the machine tool can be set at an end part of a screen of the display part, and when the state of the machine tool matches a preset condition, the display control part can display the notification image corresponding to the state of the machine tool in the information display area, and display the information on the state of the machine tool in the display part when the operator selects the notification image.

According to the present invention, the control apparatus for the machine tool in which operation method is easy and which reduces the number of operation performed by the operator can be provided.

DETAILED DESCRIPTION OF THE INVENTION

Referring to FIGS. 1 to 15, a control apparatus for a machine tool according to an embodiment will be described. The machine tool according to the present embodiment is a numeral control type that automatically moves a tool and a workpiece relatively to each other so as to perform machining on the basis of a machining program.

Figure 1:
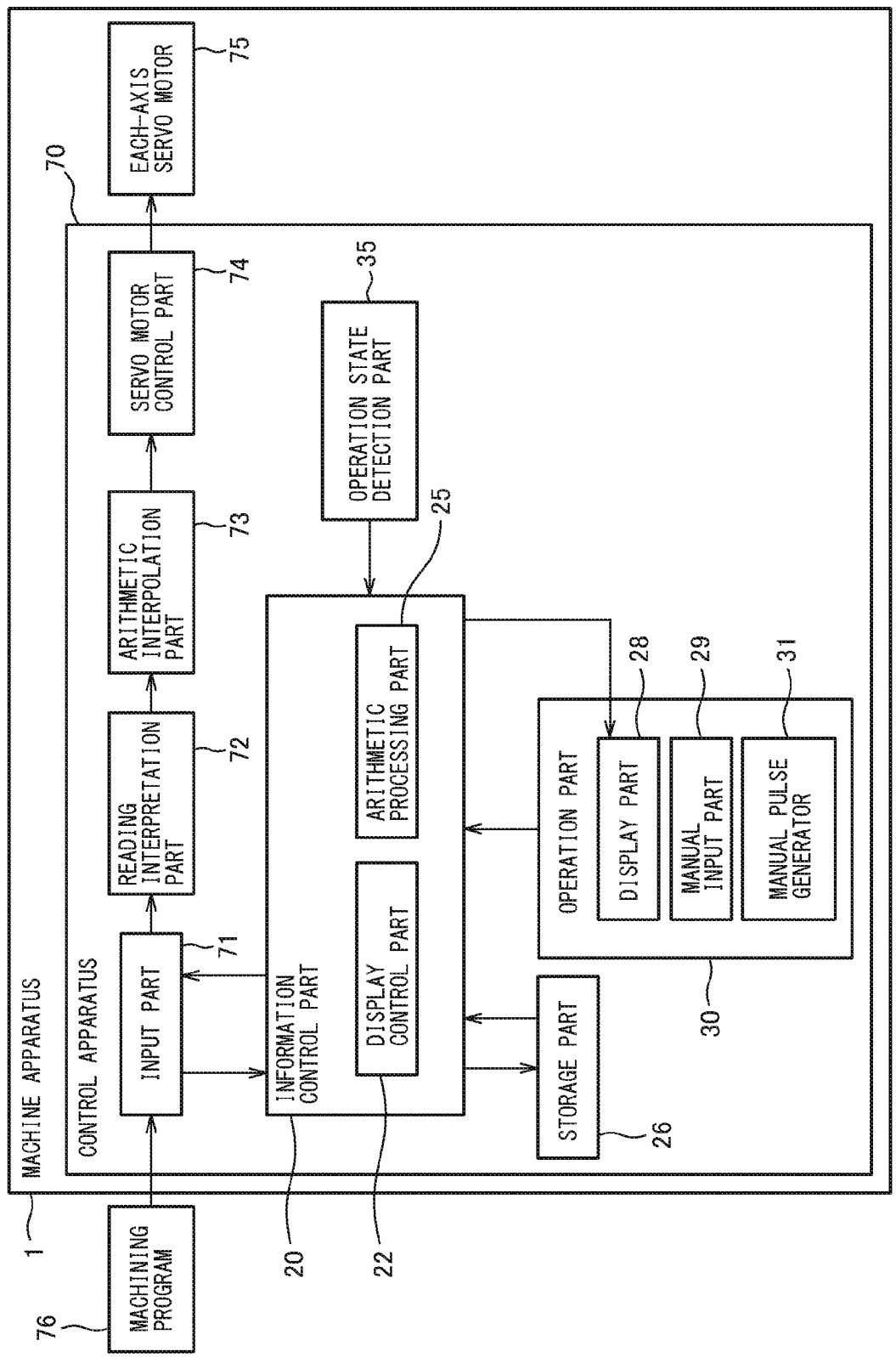
FIG. 1 is a block diagram of a machine tool.

FIG. 1 shows a block diagram of the machine tool according to the present embodiment. The machine tool 1 includes a control apparatus 70 that performs control of a movement apparatus of each feed axis. The control apparatus 70 includes, for example, a CPU (Central Processing Unit), a RAM (Random Access Memory), and a ROM (Read Only memory) which are interconnected via a bus.

The control apparatus 70 includes an input part 71, a reading interpretation part 72, an arithmetic interpolation part 73, and a servo motor control part 74. When machining by the machine tool 1 of the numerical control type, a machining program 76 is prepared in advance. The machining program 76 can be created by a CAM (Computer Aided Manufacturing) apparatus or the like on the basis of a target shape of the workpiece. The target shape of the workpiece can be created, for example, by a CAD (Computer Aided Design) apparatus. Note that a machining program newly created by an operator in an information control part 20 may be inputted to the input part 71.

The machining program 76 is inputted to the input part 71. In the machining program 76, the information on the relative movement of the tool with respect to the workpiece is included. In the machining program 76, for example, a command to the machine tool is described by a command code such as a G mode or an M code.

The reading interpretation part 72 reads the machining program 76 from the input part 71. The reading interpretation part 72 transmits a movement command to the arithmetic interpolation part 73. The arithmetic interpolation part 73 calculates a position command value for each interpolation period. For example, the arithmetic interpolation part 73 calculates a movement amount for each time interval that is set on the basis of the movement command. The arithmetic interpolation part 73 transmits the position command value to the servo motor control part 74. The servo motor control part 74 calculates a movement amount in each feed axis such as X axis, Y axis or Z axis on the basis of the position command value to drive an each-axis servo motor 75.

The control apparatus 70 according to the present embodiment includes the information control part 20 that controls machining information relating to machining of the workpiece, an operation part 30 in which the operator inputs the machining information or the like, and a display part 28 that displays information such as the machining information relating to the machine tool. The information control part 20 includes an arithmetic processing part 25 that obtains the machining information for performing current machining from the input part 71, and transmits newly created or edited machining information to the input part 71. For example, the information control part 20 can edit the machining program 76 inputted from the input part 71 so as to create the machining program for the current machining, and transmit the machining program to the input part 71. Further, the arithmetic processing part 25 can perform predetermined determination or predetermined calculation on the basis of the inputted information.

The operation part 30 includes a manual input part 29 that includes a keyboard or the like and inputs the machining information by manual operation of the operator, and a manual pulse generator 31 that transmits a pulse signal for driving the machine tool. The operation part 30 according to the present embodiment includes the display part 28. For the display part 28, a touch panel type that enables selection of a desired part by touching a screen is employed. The operator can input the machining information by operating the screen of the display part 28. The operation part 30 is The embodiment is not limited to this, but an optional apparatus that enables the operator to input the machining information can be employed.

The control apparatus 70 includes a storage part 26 that stores the machining information. The storage part 26 may be a storage apparatus such as a memory card or a hard disk coupled via a communication interface, in addition to the abovementioned ROM or RAM. The arithmetic processing part 25 causes the storage part 26 to store the machining information, or reads the machining information stored in the storage part 26.

The information control part 20 includes a display control part 22 that controls an image displayed on the display part 28. The display control part 22 obtains information from the arithmetic processing part 25, or provides information to the arithmetic processing part 25. In addition, the display control part 22 has a function of displaying the machining information inputted by the operation part 30 on the display part 28.

The control apparatus 70 according to the present invention includes an operation state detection part 35 that detects the operation state of the machine tool. As the operation state detection part 35, various sensors fitted to the machine tool 1 may be exemplified. As various sensors, a sensor fitted to the each-axis servo motor 75 that detects a rotational speed, a sensor that detects the load of a main spindle, and a sensor that detects pressing of an emergency stop button may be exemplified. The arithmetic processing part 25 receives a signal obtained by the operation state detection part 35, and detects the operation state of the machine tool.

Figure 2:
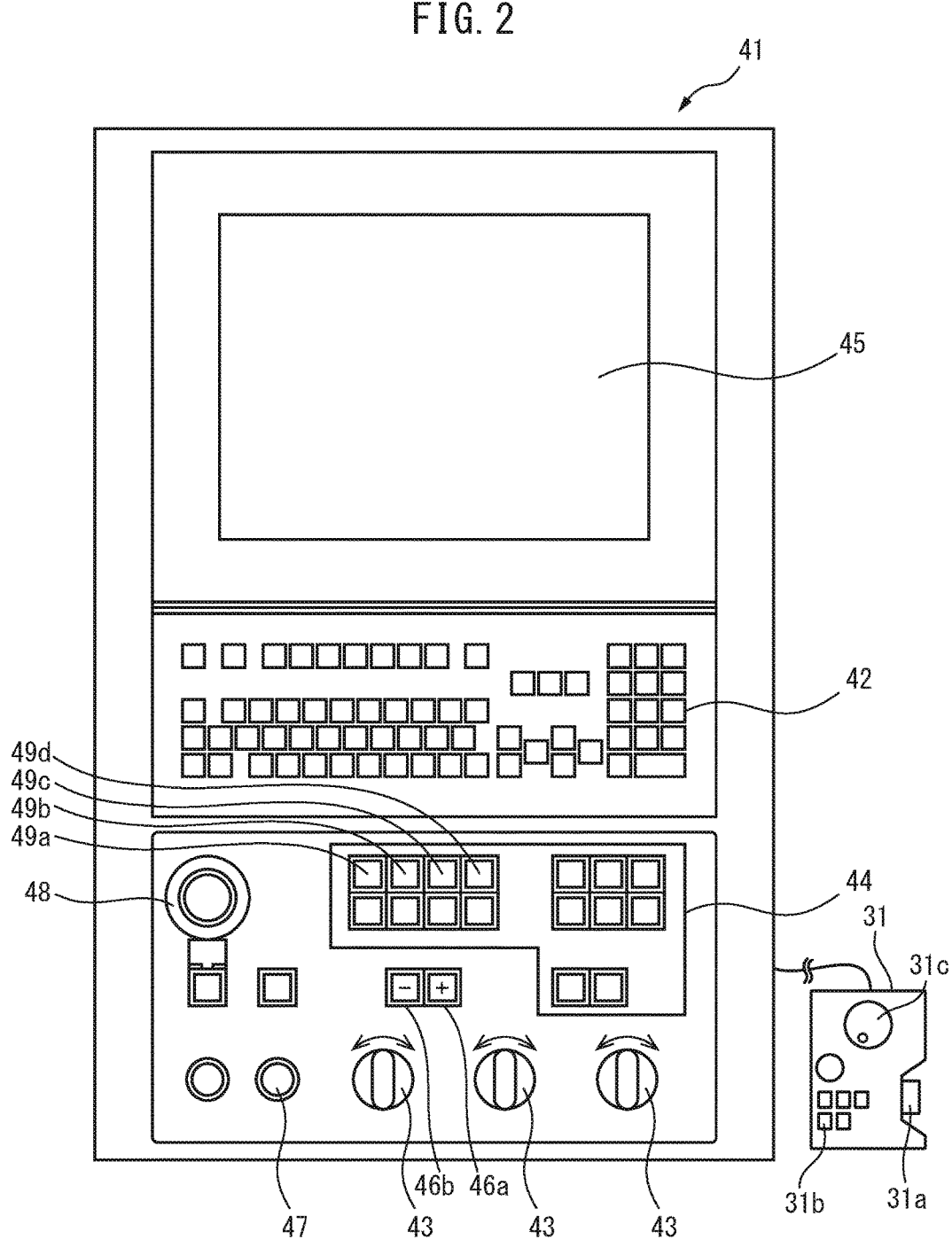
FIG. 2 is a schematic front view of an operation panel of the machine tool.

FIG. 2 shows a schematic front view of an operation panel that is arranged in the control apparatus for the machine tool. Referring to FIG. 1 and FIG. 2, the operation panel 41 includes the manual input part 29 and the display part 28 of the control apparatus 70. The operation panel 41 includes a display panel 45 that serves as the display part 28. The display panel 45 according to the present embodiment is a touch panel type. The display panel 45 also functions as the operation part 30. Note that as an apparatus for designating an optional position of the screen, a pointing device such as a mouse, a joystick or a touch pad may be employed in place of the display part of the touch panel type.

The operation panel 41 includes a keyboard part 42. A plurality of key switches are arranged in the keyboard part 42. A predetermined numeral or letter can be inputted by pressing the key switch of the keyboard part 42. The operation panel 41 includes an operation switch part 44 that selects a predetermined operation. The operation panel 41 includes jog buttons 46a and 46b for manually driving the machine tool in a positive direction or a negative direction, and an override setting part 43 that sets an override value. In addition, the operation panel 41 includes buttons such as an emergency stop button 48 for immediately stopping the machine tool at the time of an abnormality or the like, and an execution button 47 for starting driving of the machine tool.

Operation mode selection buttons 49a to 49d for selecting an operation mode of the machine tool are arranged in the operation switch part 44. The operator sets a type of an operation as an operation mode in the machine tool. For example, when performing edit of the machining program, the operator sets the machine tool in an edit mode. The operation mode of the machine tool can be switched by pressing desired operation mode selection buttons 49a to 49d. Selection of a plurality of buttons among the operation mode selection buttons 49a to 49d is inhibited, and one operation mode is selected.

The override setting part 43 can set an override value of the rotational speed of the main spindle, an override value of a feed speed of the machining or the like, for example, by rotating a knob. The keyboard part 42, the operation switch part 44, the override setting part 43, and various buttons arranged on the operation panel 41 function as the manual input part 29 of the operation part 30.

The manual pulse generator 31 is coupled to the operation panel 41. The manual pulse generator 31 is formed to be compact so as to be able to be operated while being held by the operator. The manual pulse generator 31 includes an enable button 31a that serves as a permission button that enable transmission of a pulse signal during pressing the button. An operation by the manual pulse generator 31 is enabled while the operator is pressing the enable button 31a. The manual pulse generator 31 is formed so as not to perform transmission of an operation signal in a state where the operator is not pressing the enable button 31a. An axis selection switch 31b for selecting a feed axis to be driven and a dial 31c for adjusting a pulse generation amount are arranged in the manual pulse generator 31.

When operating the machine tool, the operator selects the operation mode of the machine tool. The operation mode of the machine tool according to the present embodiment includes an edit mode that enables edit of the machining program or the like, and an execution mode for driving the machine tool on the basis of the machining program. Further, the operation mode includes a trial operation mode that inputs a test program and performs a trial operation of the machine tool on the basis of an inputted test program, and a manual operation mode for manually driving the machine tool. Note that the trial operation mode is also referred to as a MDI (Manual Data Input) mode.

When designating an operation mode, the operator presses the operation mode selection buttons 49a to 49d. The machine tool is set to the edit mode by pressing the operation mode selection button 49a. The machine tool is set to the execution mode by pressing the operation mode selection button 49b. The machine tool is set to the manual operation mode by pressing the operation mode selection button 49c. The machine tool is set to the trial operation mode by pressing the operation mode selection button 49d.

Figure 3:
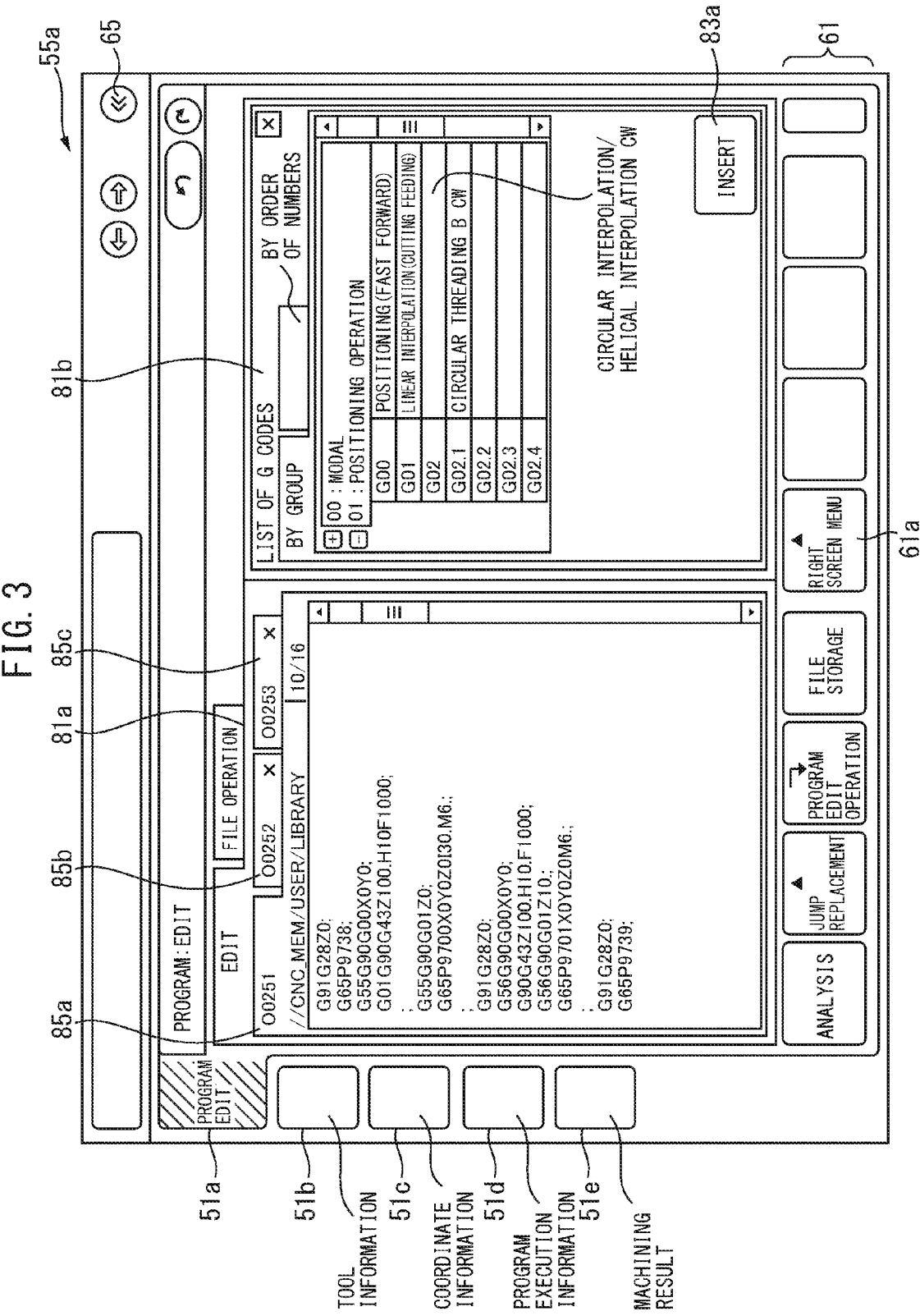
FIG. 3 is first program edit screen displayed on a display panel of the operation panel.

FIG. 3 shows first program edit screen among screens displayed on the display panel of the operation panel. The program edit screen is the screen for creating or displaying a machining program for machining the workpiece or a test program for a trial operation. A case of creating a new program and a case of editing a program already created are included in the creation of the program. Selection parts 51a to 51e for manually switching a screen to be displayed are arranged on the left side of the screen. In the example illustrated in FIG. 3, the program edit screen is displayed by an operator pressing the selection part 51a for program edit.

A tool information screen can be displayed by pressing the selection part 51b for tool information among the selection parts 51a to 51e. The tool information screen is a screen for inputting, displaying and editing information on a tool. A coordinate information screen can be displayed by pressing the selection part 51c for coordinate information. The coordinate information screen is a screen for inputting, displaying and editing coordinate information. An execution information screen can be displayed by pressing the selection part 51d for program execution information. The execution information screen is a screen for displaying the state of the machine tool or a machining state during execution of the machining program. A machining result screen can be displayed by pressing the selection part 51e for a machining result. The machining result screen is a screen for displaying a driving result of the machine tool after machining the workpiece, a machining result of the workpiece, and an inspection result of the workpiece.

The screens displayed by pressing the selection parts 51*a* to 51*e* are screens frequently used at the time of actual machining, and are referred to as main screens in the present embodiment. The main screen is formed so that a plurality of display areas can be set in order to display a plurality of pieces of information. A button area 61 is formed in the lower side area of each main screen. Buttons are arranged for performing predetermined operation in the button area 61.

The selection parts 51*a* to 51*e* for selecting each main screen are formed so that at least a part of the selection part can be displayed in any screen. For example, the selection parts 51*a* to 51*e* are always displayed for the period during which the main screens are displayed. When auxiliary screens are displayed by being superimposed on the main screens, at least a part of the selection parts 51*a* to 51*e* is displayed. Accordingly, the operator can easily transfer to a desired main screen. In addition, the operator can cause the desired main screen to be displayed with a small number of the operation.

Further, the selection parts 51*a* to 51*e* according to the present embodiment are arranged in a row. The order of the selection parts 51*a* to 51*e* is arranged so as to be similar to a general machining procedure. For example, the operator first performs edit of a program. After editing the program, edit of tool information and edit of coordinates such as workpiece coordinate systems are performed. Then, machining is executed on the basis of the machining program. A machining result is confirmed after the execution of the machining. Further, the machined workpiece is inspected or the like. The selection parts 51*a* to 51*e* are arranged in a row corresponding to such a machining order. Thus, even an operator unaccustomed to the operation of the machine tool can proceed with the machining according to the order of the selection parts without searching for preferable main screens.

Thus, in the control apparatus according to the present embodiment, the selection part 51*a* for displaying the program edit screen, the selection part 51*b* for displaying the tool information screen including the tool information, the selection part 51*c* for displaying the coordinate information screen including the information on the coordinates, a selection part 51*d* for displaying the execution information screen for executing the machining program, and a selection part 51*e* for displaying the machining result screen including the machining result are displayed in this order on the display panel 45.

Regarding a user setting screen, a maintenance screen, and an operation result screen of the machine tool used by a skilled operator of the machine tool, a maintenance operator of the machine tool, and the like, a support screen is displayed when a support screen button 65 is pressed. The operator can select a desired screen from the support screen so as to display the screen.

In the present embodiment, the selection parts 51*a* to 51*e* for the main screen are arranged in a longitudinal direction on the left side of the screen. The embodiment is not limited to this, but the selection parts may be arranged in a row in an optional area. Further, the types of main screens are not limited to the abovementioned forms, but optional screens can be added or deleted.

The first program edit screen 55*a* according to the present embodiment includes a display area 81*a* and a display area 81*b*. In the program edit screen 55*a*, a screen is divided into two, and formed so that two types of information can be displayed. The machining program is displayed in the display area 81*a*. A machining program can be created in the display area 81*a*. A plurality of selection parts 85*a* to 85*c* are arranged in the display area 81*a*. The respective selection parts 85*a* to 85*c* correspond to a plurality of machining programs. A user can select a machining program to be created by pressing any one of the selection parts 85*a* to 85*c*. Referring to FIG. 2, for example, a character string can be inputted or edited by pressing the key switches arranged in the keyboard part 42.

Information displayed in the right display area 81*b* can be selected by pressing a button 61*a* arranged in the button area 61. In the example illustrated in FIG. 3, a list of G codes that are command codes is displayed in the display area 81*b*. The operator can create a machining program referring to the list of G codes.

When creating the machining program, the machine tool is set to the edit mode. Referring to FIG. 2, when the machine tool 1 is set to the operation mode other than the edit mode, the operation mode selection button 49*a* for setting the machine tool to the edit mode is pressed. In the present embodiment, when the operator presses the operation mode selection button 49*a*, the display control part 22 obtains information that the operation mode is set to the edit mode, and displays the program edit screen on the display panel 45. When the operator switches the operation mode, it can be judged that there is a high possibility that the operator performs operation corresponding to the operation mode. The control apparatus 70 according to the present embodiment is formed so as to switch to a screen frequently used in the designated operation mode when the operation mode selection button is pressed.

Referring to FIG. 1, screen setting corresponding to an operation of the operator or the state of the machine tool is stored in advance in the storage part 26. When the operation mode other than the edit mode is switched to the edit mode, the arithmetic processing part 25 reads setting of the program edit screen from the storage part 26, and the display control part 22 displays the program edit screen on the display part 28 on the basis of the read setting. Accordingly, the program edit screen 55*a* is automatically displayed even when the operator does not press the selection part 51*a* for program edit in the main screen. There is no necessity for the operator to perform an operation of displaying the screen to create the machining program, and the number of operation for creating the machining program can be reduced.

Figure 4:
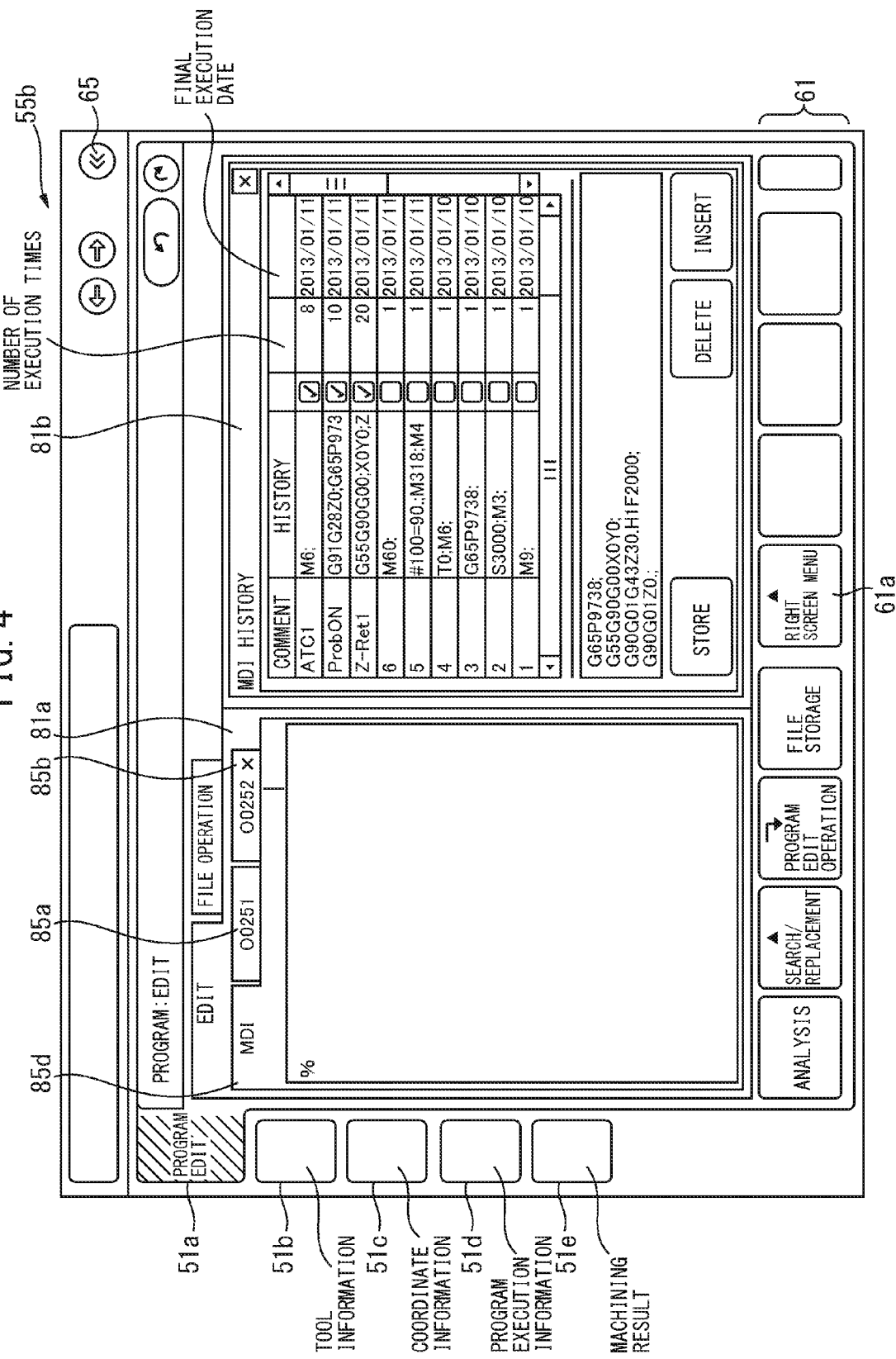
FIG. 4 is second program edit screen displayed on the display panel of the operation panel.

FIG. 4 shows second program edit screen. The second program edit screen is a screen that creates a test program for performing a trial operation. In the conventional machine tool, a screen referred to as MDI (Manual Data Input) corresponds to this screen. On the second program edit screen 55*b*, a screen is divided into a display area 81*a* and a display area 81*b*. Among the selection parts 85*d*, 85*a*, and 85*b* of the display area 81*a*, the selection part 85*d* that can input or edit the test program is selected. The test program is displayed in the display area 81*a*. The test program can be created in the display area 81*a*. When creating the test program, a desired screen can be displayed in the display area 81*b* by pressing a button 61*a*. Information relating to the test program can be displayed in the display area 81*b*.

When creating the trial operation program and performing a trial operation of the machine tool, the operation mode of the machine tool is set to a trial operation mode. Referring to FIG. 2, the operator sets the machine tool to the trial operation mode by pressing the operation mode selection button 49*d* that is set to the trial operation mode. In this case, the display control part 22 obtains information of which operation mode is set to the trial operation mode, and displays the program edit screen 55b on the display panel 45. In other words, when a screen other than the program edit screen 55b is displayed on the display panel 45, the program edit screen 55b is automatically displayed by pressing the operation mode selection button 49d.

In the display area 81a, the selection parts 85a and 85b for selecting screens in which the machining program is edited are displayed in addition to the selection part 85d for selecting the screen in which the test program is created. However, when the operation mode selection button 49d for setting to the trial operation mode is pressed, the selection part 85d for creating the test program is automatically selected. Thus, there is no necessity for the operator to perform an operation of displaying the screen to create the test program, and the number of operation for creating the test program can be reduced.

Figure 5:
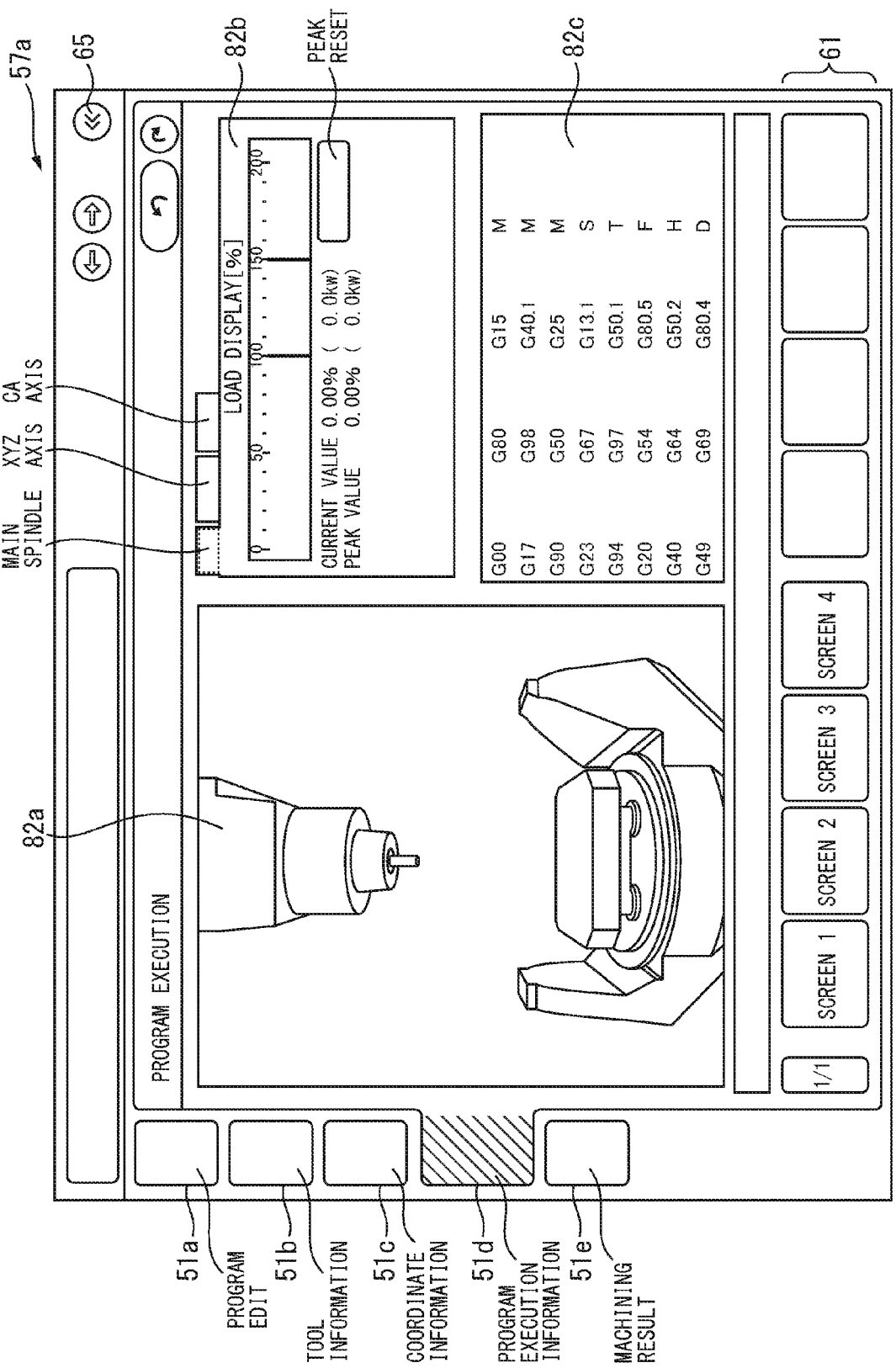
FIG. 5 is an execution information screen displayed on the display panel.

FIG. 5 shows an execution information screen according to the present embodiment. Information on the machining state of the workpiece, the state of the machine tool or the like is displayed on the execution information screen. The execution information screen 57a can be displayed by pressing the selection part 51d.

The execution information screen 57a is divided into three display areas 82a to 82c. In this example, a table and a schematic diagram of the current state of the main spindle are displayed in the display area 82a. Information on a load applied to the main spindle is displayed in the display area 82b. Modal information on a modal code for maintaining a predetermined state on the basis of a command code to be executed by the machine tool is displayed in the display area 82c. In the example illustrated in FIG. 5, the screen is divided into three. The embodiment is not limited to this, but the screen can be divided into an optional number. In addition, the each display area is formed so that the information desired by the operator can be displayed.

Switching buttons that enable switching from first selection screen to fourth selection screen are arranged in the button area 61 of the lower side of the execution information screen 57a. The desired number of dividing the display area and information to be displayed in the display areas for each selection screen are registered in advance and the selection screens can be switched.

When executing the machining program, the operation mode of the machine tool is set to the execution mode. Referring to FIG. 2, the operator sets the machine tool to the execution mode by pressing the operation mode selection button 49b for setting to the execution mode. In this instance, the display control part 22 obtains information that the machine tool is set to the execution mode, and displays the execution information screen on the display panel 45. In other words, when a screen on the display panel 45 is a screen other than the execution information screen 57a, the screen is automatically switched to the execution information screen 57a. Accordingly, the operator has no necessity of performing an operation of displaying the screen for executing the machining program, and the number of operation of the machine tool at the time of executing the machining program can be reduced.

Figure 6:
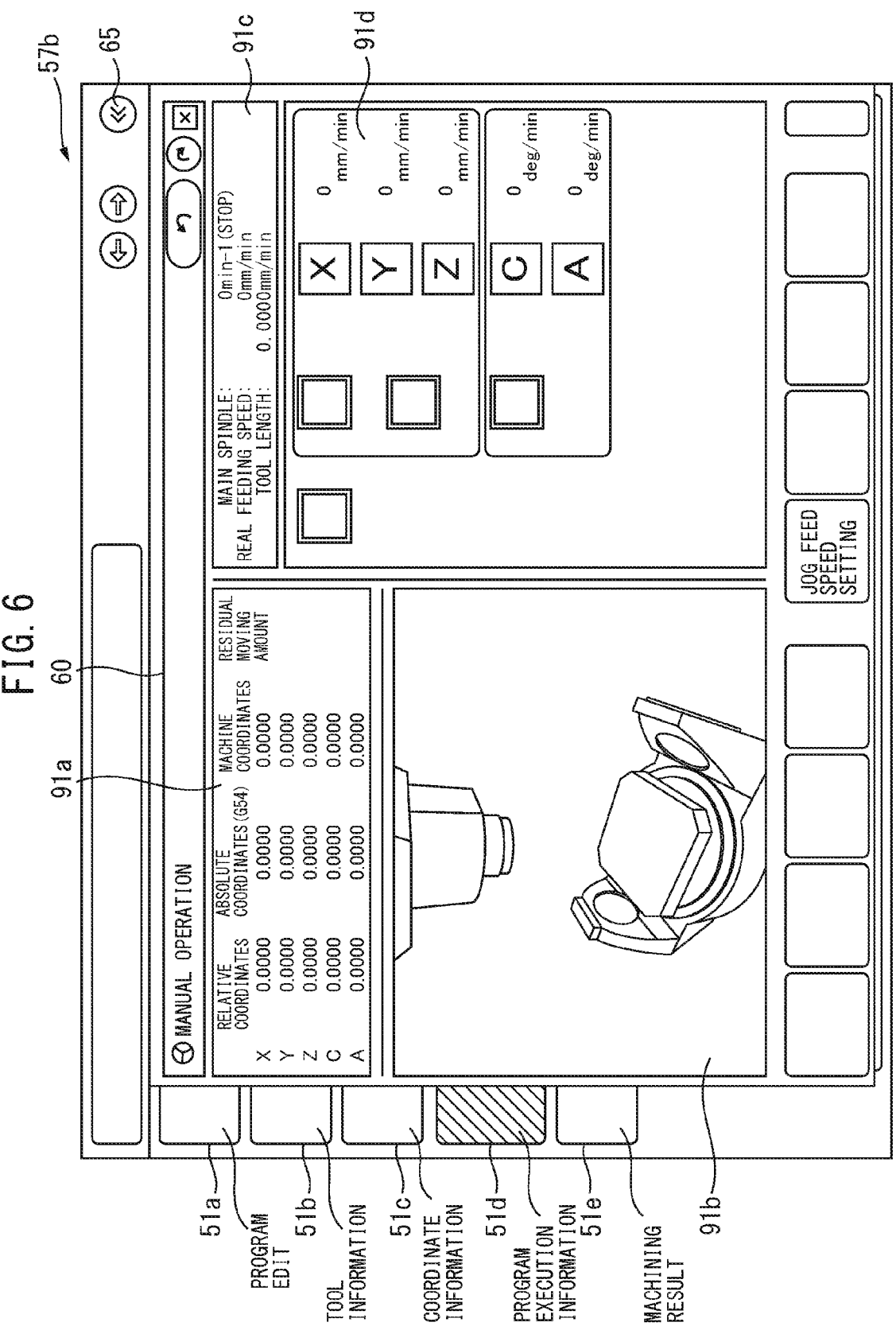
FIG. 6 is a manual operation screen displayed on the display panel.

FIG. 6 shows a manual operation screen displayed by being superimposed on the main screen among the screens displayed on the display panel of the operation panel. The manual operation screen is a screen for inputting conditions or displaying a state of a machining chamber when the machine tool is manually operated. In the example illustrated in FIG. 6, a manual operation screen 60 is displayed as an auxiliary screen by being superimposed on the execution information screen 57b. The manual operation screen 60 has display areas 91a, 91b, 91c, and 91d. A coordinate value of a predetermined coordinate system is displayed in the display area 91a. A schematic diagram of the current state of parts of the main spindle and the table in the machining chamber is displayed in the display area 94b. Information relating to driving such as a feed speed is displayed in the display area 91c. Buttons or the like for selecting feed axis for driving are displayed in the display area 91d.

When manually driving the machine tool, the operator selects a feed axis for driving by pressing the button of the feed axis for driving in the display area 91d. Referring to FIG. 2, the selected feed axis can be driven in a desired direction by pressing the jog button 46a or the jog button 46b of the operation panel 41. Alternatively, in the manual pulse generator 31, a desired feed axis is selected by the axis selection switch 31b. Then, the state in which the enable button 31a is pressed is maintained. The selected feed axis can be driven in a desired direction by rotating the dial 31c.

When manually driving the machine tool, the operator sets the operation mode to a manual operation mode. The operator sets the operation mode of the machine tool to the manual operation mode by pressing the operation mode selection button 49c for setting to the manual operation mode. In this instance, the display control part 22 obtains information that the machine tool is set to the manual operation mode, and displays the manual operation screen 60 on the display panel 45. In other words, when a screen on the display panel 45 is a screen other than the manual operation screen 60, the screen is automatically switched to the manual operation screen 60. Accordingly, the operator has no necessity of performing an operation of displaying the manual operation screen, and the number of operation of the machine tool at the time of executing the manual operation can be reduced.

When manually displaying the manual operation screen 60, the operator displays the support screen by pressing the support screen button 65. Then, the manual operation screen 60 can be displayed by selecting the item of the manual operation screen from the support screen.

During the period when the operation mode of the machine tool is set to the manual operation mode, desired setting may be performed by moving to other main screen or the like. After performing the desired setting, the manual operation may be performed again.

For example, in the manual operation mode, the operator manually moves the tool to a predetermined position. A coordinate value is displayed in the display area 91a of the manual operation screen 60. The operator reads the coordinate value at that time. Next, the operator moves to the coordinate information screen of the main screen. The coordinate information screen is displayed on the display panel 45. A workpiece coordinate system is set on the coordinate information screen. Subsequently, there is a case that the machine tool is manually driven again. In such a case, by pressing the enable button 31a of the manual pulse generator 31, the display control part 22 obtains information that the enable button 31a is pressed, and displays the manual operation screen 60 on the display panel 45.

In the state in which the manual operation mode is selected, the control apparatus 70 according to the present embodiment switches to the manual operation screen 60 when the enable button 31a is pressed while a screen other than the manual operation screen 60 is displayed on the display panel 45. The operator has no necessity of displaying the manual operation screen 60 by pressing the support screen button 65, and can easily display the manual operation screen 60. Through this control, the operator can reduce the number of operation of the machine tool when executing the manual operation. Note that the manual operation screen 60 can be displayed again by pressing the operation mode selection button 49*c* for the manual operation mode.

Thus, in the machine tool according to the present embodiment, the display control part obtains the operation of the operator, reads the display setting of the display part corresponding to the operation of the operator from the storage part, and changes the display on the display part on the basis of the display setting. In particular, when the operator switches the operation mode, the display control part reads the display setting corresponding to the operation mode from the storage part, and switches the display on the display part on the basis of the display setting. With this configuration, the screen frequently used by the operator is automatically displayed on the display part even when the operator does not perform an operation of switching the main screen. Thus, the operation of the machine tool becomes easy, and the number of operation of the machine tool can be reduced. In particular, an operator unskilled in the operation of the machine tool can operate the machine tool without being confused in the operation.

Next, control for displaying a notification image that notifies the operator of the state of the machine tool according to the state of the machine tool will be described.

Figure 7:
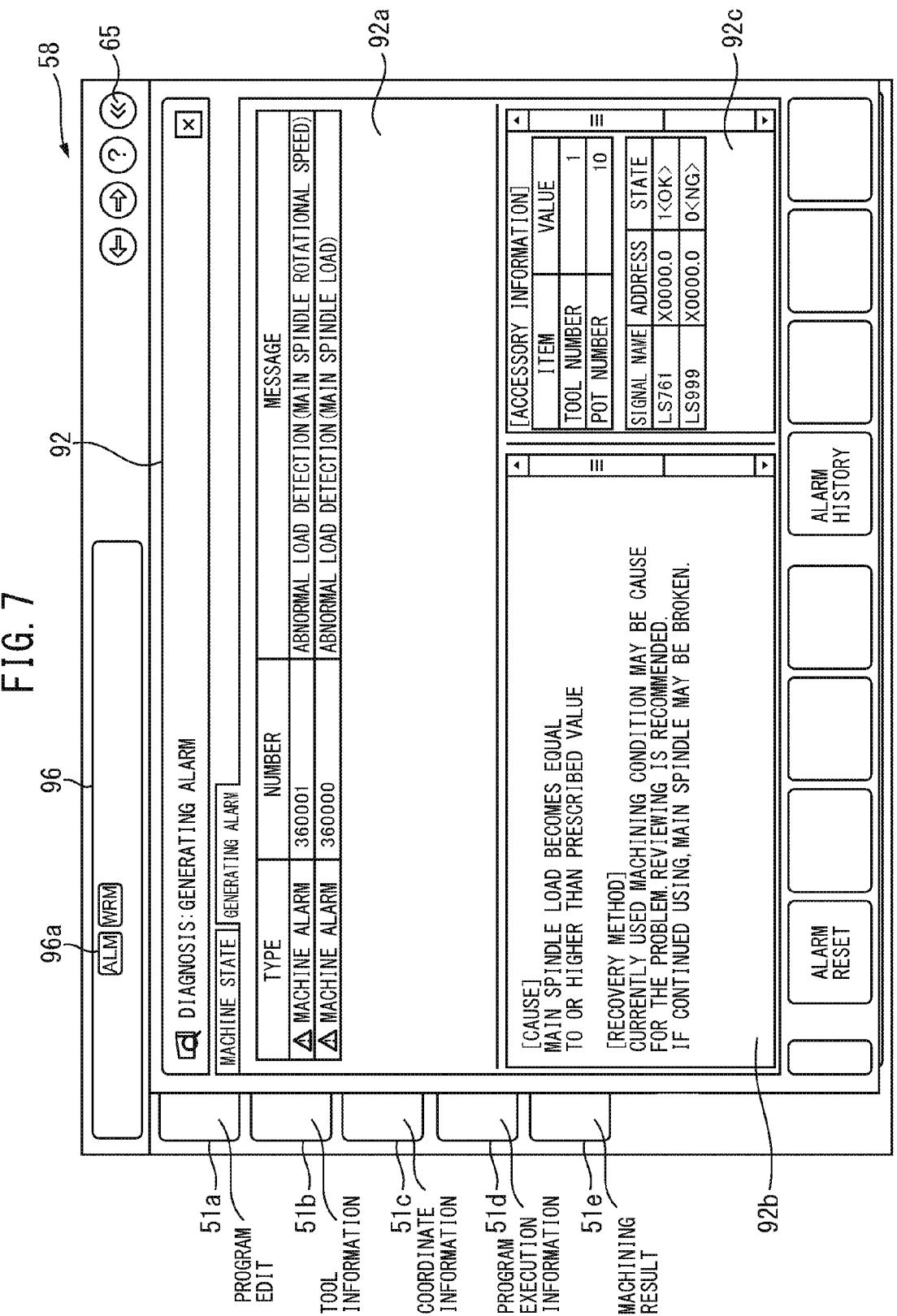
FIG. 7 is first auxiliary screen for displaying the state of the machine tool, which is displayed by being superimposed on a main screen.

FIG. 7 shows first auxiliary screen for displaying the state of the machine tool, which is displayed by being superimposed on the main screen. In the state illustrated in FIG. 7, an auxiliary screen 92 is displayed by being superimposed on the main screen.

An information display area 96 is set at the upper part of each of the main screens. Referring to FIG. 1 and FIG. 7, the operation state detection part 35 detects the operation state of the machine tool in each operation mode. The arithmetic processing part 25 determines whether or not the state of the machine tool 1 matches a preset condition. When the state of the machine tool 1 matches the preset condition, the display control part 22 obtains the determination result, and displays an icon 96*a* as the notification image corresponding to the state of the machine tool 1 in the information display area 96. The icon as the notification image is stored in advance in the storage part 26.

The information display area 96 is formed in the upper part of the screen on the display panel. The information display area 96 is formed so that a plurality of icons can be displayed. The position of the information display area 96 is not limited to the upper part of the screen on the display panel 45, but can be arranged at the end part of the screen. For example, the information display area 96 may be arranged in the lower part, at the end part of the right side or at the end part of the left side of the screen on the display panel 45.

In the example illustrated in FIG. 7, the operation stare detection part 35 detects that an excessive load is applied to the main spindle during the machining. The arithmetic processing part 25 determines whether or not the load on the main spindle exceeds a preset determination value. The arithmetic processing part 25 determines that an abnormal load is applied to the main spindle. The display control part 22 obtains the determination result of the arithmetic processing part 25, and newly displays a warning icon 96*a* corresponding to the abnormality of the main spindle. Thus, the display control part obtains the state of the machine tool, reads the display setting corresponding to the state of the machine tool from the storage part, and changes the display on the display part on the basis of the display setting.

The control apparatus 70 according to the present embodiment displays information on the state of the machine tool on the auxiliary screen, when the operator selects the icon 96*a*. The information display area 96 is always displayed even when the main screen is switched. Thus, the operator can always grasp the state of the machine tool. In addition, when the operator presses the icon 96*a*, the display control part 22 displays the auxiliary screen 92 including information on warning of the machine tool 1. The operator can confirm detailed information relating to the icon 96*a* on the auxiliary screen 92.

When displaying the auxiliary screen 92, the support screens may be displayed by pressing the support screen button 65, and a screen for displaying a warning detail may be selected from the support screens. However, the support screen needs to be displayed at the beginning. Further, it takes time to select an item since there are many items on the support screen. In the control apparatus 70 according to the present embodiment, the content of the warning generated by displaying the auxiliary screen 92 can be confirmed by the operation of pressing the icon 96 notifying of the warning. The operator has no necessity of searching for a screen that displays information on the state of the machine tool, and can easily display a desired auxiliary screen. Alternatively, the desired auxiliary screen can be displayed with a small number of operation.

Figure 8:
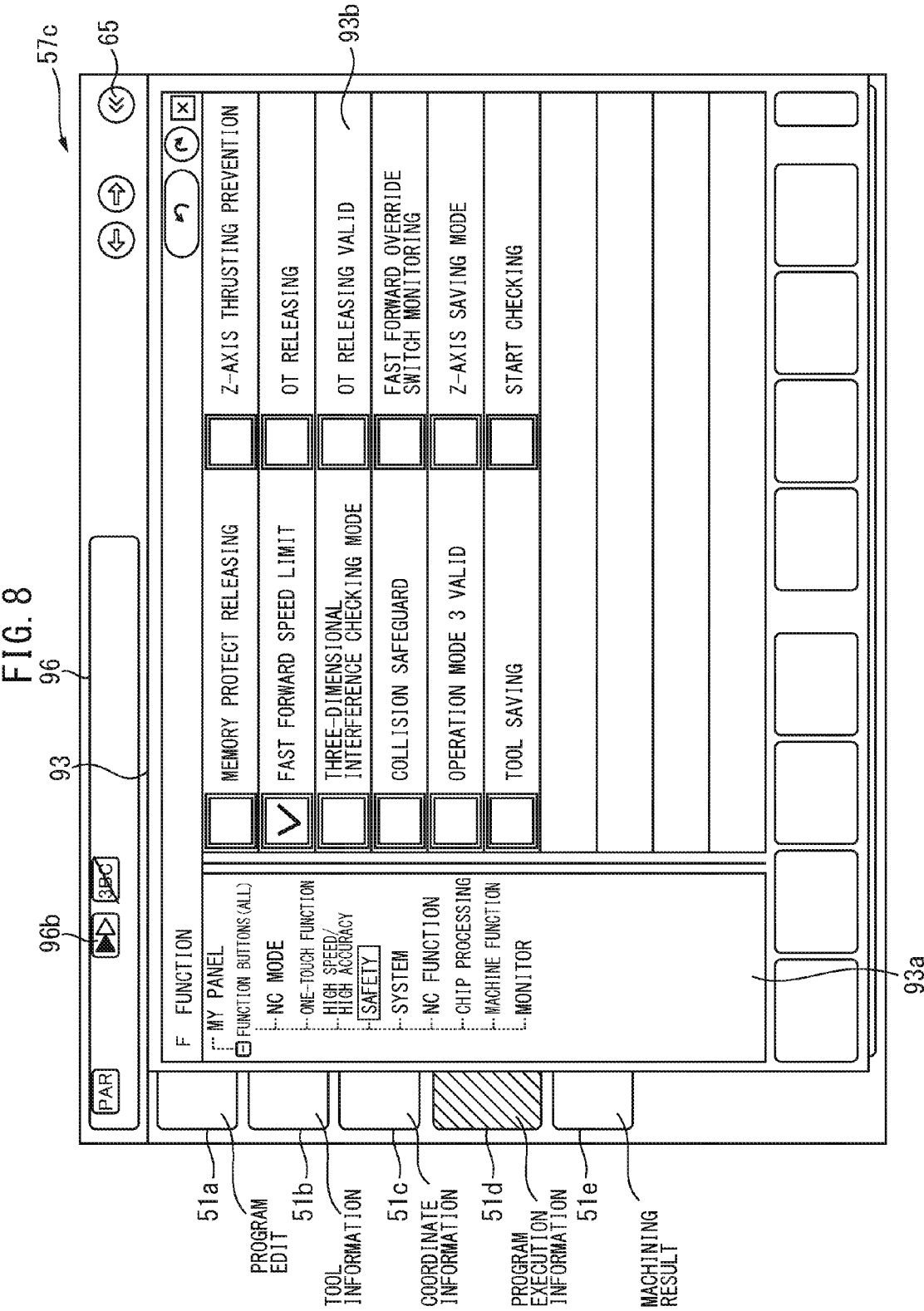
FIG. 8 is second auxiliary screen for displaying the state of the machine tool, which is displayed by being superimposed on the main screen.

FIG. 8 shows a screen on which second auxiliary screen is displayed by being superimposed on the main screen. On the screen illustrated in FIG. 8, the selection part 51*d* is selected, and the execution information screen among the main screens is displayed. When the support screen button 65 is pressed on the execution information screen, an auxiliary screen 93 is displayed as a support screen by being superimposed on the main screen. The auxiliary screen 93 has display areas 93*a* and 93*b*. When an item "Safety" is selected from among items displayed in the display area 93*a*, an item regarding safety of the machine tool is displayed in the display area 93*b*.

In the example illustrated in FIG. 8, an item "Fast forward speed limit" is selected. The speed of the feed axis can be limited so as to become equal to or lower than a predetermined speed by selecting this item. By executing this control, for example, safe movement of the tool or the table can be confirmed before the workpiece is actually machined by the machining program.

The display control part 22 obtains information that the axis feed speed limit is set, and displays an icon 96*b* as a notification image corresponding to the axis feed speed limit in the information display area 96. The operator can confirm that the axis feed speed limit is set during the period when the machining program is executed. In addition, it can be avoided to forget to release the axis feed speed limit after confirming that the machine tool is safely driven.

The operator can display the auxiliary screen 93 by pressing the icon 96*b*. Further, a safety item is automatically selected in the display area 93*a*. The screen including the item "Fast forward speed limit" is displayed in the display area 93*b*. The function of the fast forward speed limit can be released by pressing the item of the fast forward speed limit.

As a function of the machine tool, a three-dimensional interference check function or the like is exemplified, in addition to the function of limiting the axis feed speed. As a three-dimensional interference check function, a simple model is preset in the machine tool. When the occurrence of interference is determined on the basis of the simple model, a warning is issued and the operation is automatically stopped. When the operator selects invalidation of the three-dimensional interference check function, the display control part 22 displays an icon relating to the three-dimensional interference check function in the information display area 96. The operator can confirm that the three-dimensional interference check function is invalidated. Then, the auxiliary screen 93 is displayed by pressing the icon displayed in the information display area 96. At this instance, the item of "Safety" for displaying the item of the three-dimensional interference check function is automatically selected in the display area 93*a*. The operator can easily release the invalid state of the three-dimensional interference check function.

As notification images displayed in the information display area 96, a notification image relating to the optional state of the machine tool can be displayed in addition to the examples illustrated in FIG. 7 and FIG. 8. When the state of the machine tool matches a preset condition, the notification image corresponding to the state of the machine tool can be displayed. For example, when a predetermined item of periodic inspection reaches the execution date of inspection, an icon notifying that the periodic inspection is necessary can be displayed in the information display area 96. The operator can display an auxiliary screen including detailed information on the item or the like of periodic inspection by pressing the icon of periodic inspection.

Alternatively, by pressing an emergency stop button 48 arranged on the operation panel 41, the operator can display an icon notifying that the emergency stop button is pressed in the information display area 96. Then, by pressing an icon notifying that the emergency stop button is pressed, an auxiliary screen including detailed information on an emergency stop can be displayed.

Thus, since the notification image relating to the notification or warning is displayed in the information display area 96, the operator can easily grasp the state of the machine tool. Further, by selecting the displayed notification image, the detailed information relating to the notification image can be displayed, and the information on the notification or warning can be easily displayed with a small number of the operation. As the notification image, an optional image can be employed. For example, the notification image is not limited to the icon including a picture, but may be a character string.

Next, a support function for easy creation of programs such as a machining program or a test program for driving the machine tool in the control apparatus according to the present embodiment will be described. In creating the machining program, a command code such as a G code or an M code is frequently used. The tool is moved relative to the workpiece in order to machine the workpiece, or a supply apparatus of a lubrication oil is controlled on the basis of the command code. The command code includes an argument for defining control. However, there are many command codes, and it is difficult for the operator to memorize all the numbers of the command codes and the arguments corresponding to the command codes.

Thus, in the conventional technique, when creating a machining program, work is carried out referring to a reference material such as an operation manual or a written memo. However, it may take time or errors may occur when carrying out the work referring to the reference material. Work efficiency is low, and a burden on the operator is heavy. The control apparatus according to the present embodiment supports an input work of a command code by the operator, thereby facilitating input of the command code.

Figure 9:
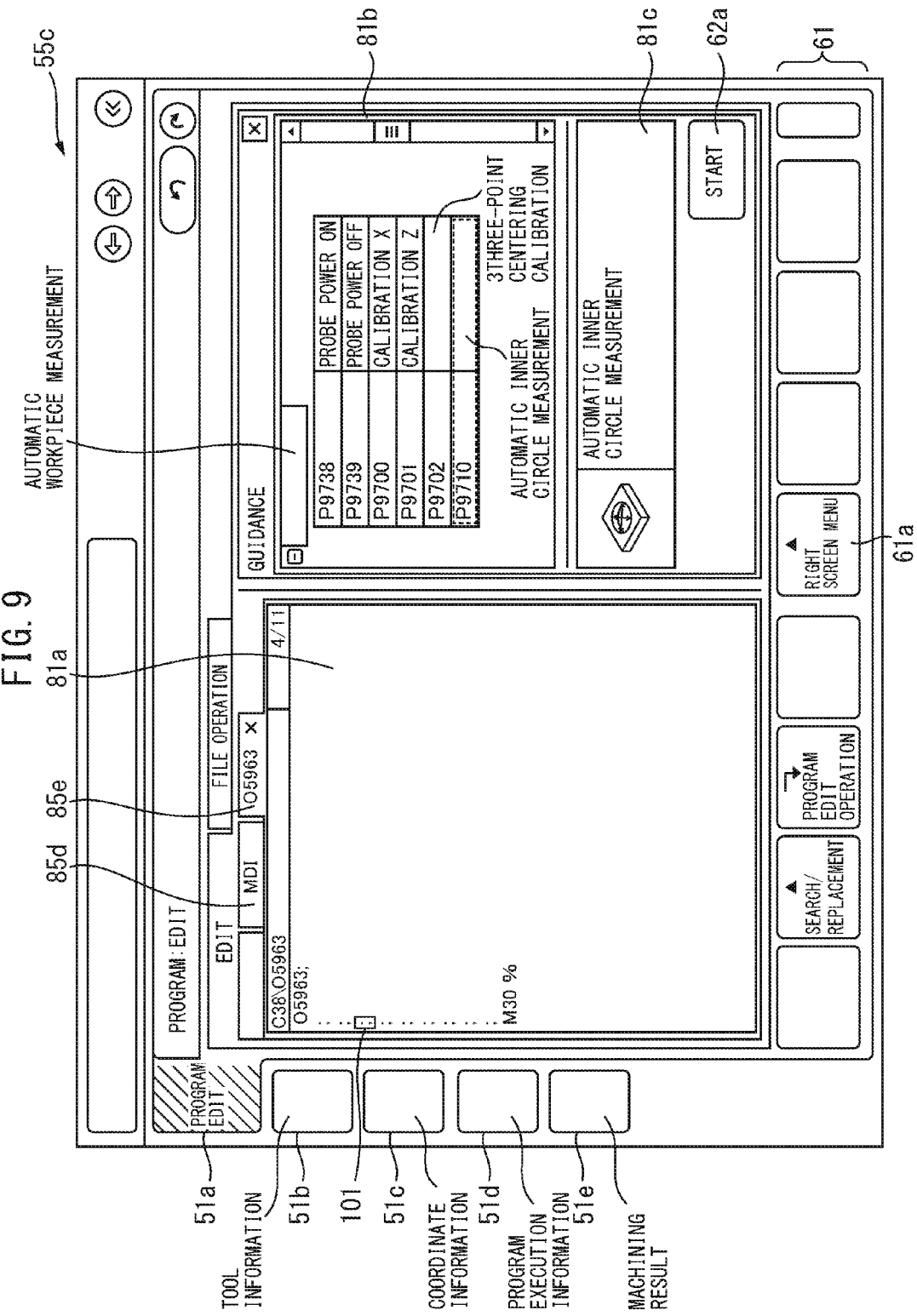
FIG. 9 is first screen of third program edit screen displayed on the display panel.

FIG. 9 shows first screen of third program edit screen according to the present embodiment. On a program edit screen 55*c*, a screen is divided into three, and display areas 81*a* to 81*c* are displayed. A screen for supporting input work of the machining program is displayed in the display area 81*b*. An image for explaining an item selected in the display area 81*b* is displayed in the display area 81*c*. A selection part 85*e* is selected and a machining program named "05963" is displayed in the display area 81*a*. A cursor 101 for indicating the position in which a character or a numeral is inputted is displayed on the screen for creating the machining program.

A program for automatically measuring the workpiece is inserted into the machining program. A guide is displayed in the display areas 81*b* and 81*c* by pressing the button 61*a* of a menu on a right screen so as to select a guidance item. In this case, a guidance for automatic measurement of the workpiece is selected from among a plurality of guidance in the display area 81*b*. Then, an item "Automatic inner circle measurement" is selected from among the automatic measurement of the workpiece. In the display area 81*c*, a description regarding control for automatically measuring an inner diameter of a circle is displayed. In the display area 81*c*, the creation of a machining program is started by pressing a button 62*a* for a start.

Figure 10:
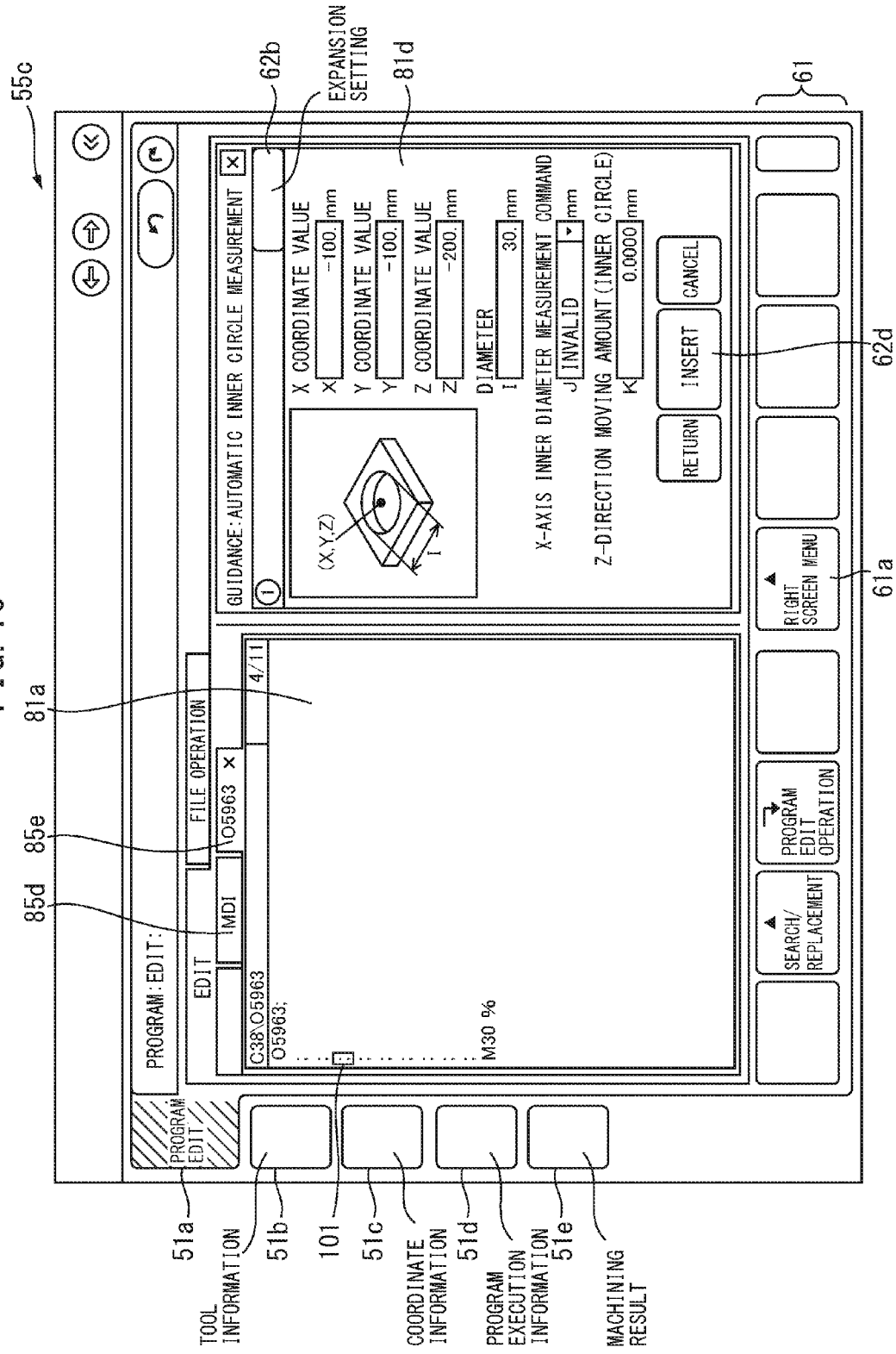
FIG. 10 is second screen of the third program edit screen displayed on the display panel.

FIG. 10 shows second screen of the third program edit screen according to the present embodiment. A display area 81*d* is displayed by pressing the button 62*a* for a start. In the display area 81*d*, information on an essential argument to be inputted is displayed. For example, the input section or the like of an X coordinate at the center of the inner circle is displayed. The operator selects the input section and inputs each value or an item. Information displayed on this screen is information on the argument which needs to be inputted. Thus, the operator can avoid forgetting to set the argument.

The argument of the command code includes what is possible to be omitted. The argument which is possible to be omitted can be set by pressing a button 62*b* for an expansion setting. Note that when the argument which is possible to be omitted is not inputted, the argument preset in the control apparatus may be automatically described in addition to omitting description of the argument of the command code.

Figure 11:
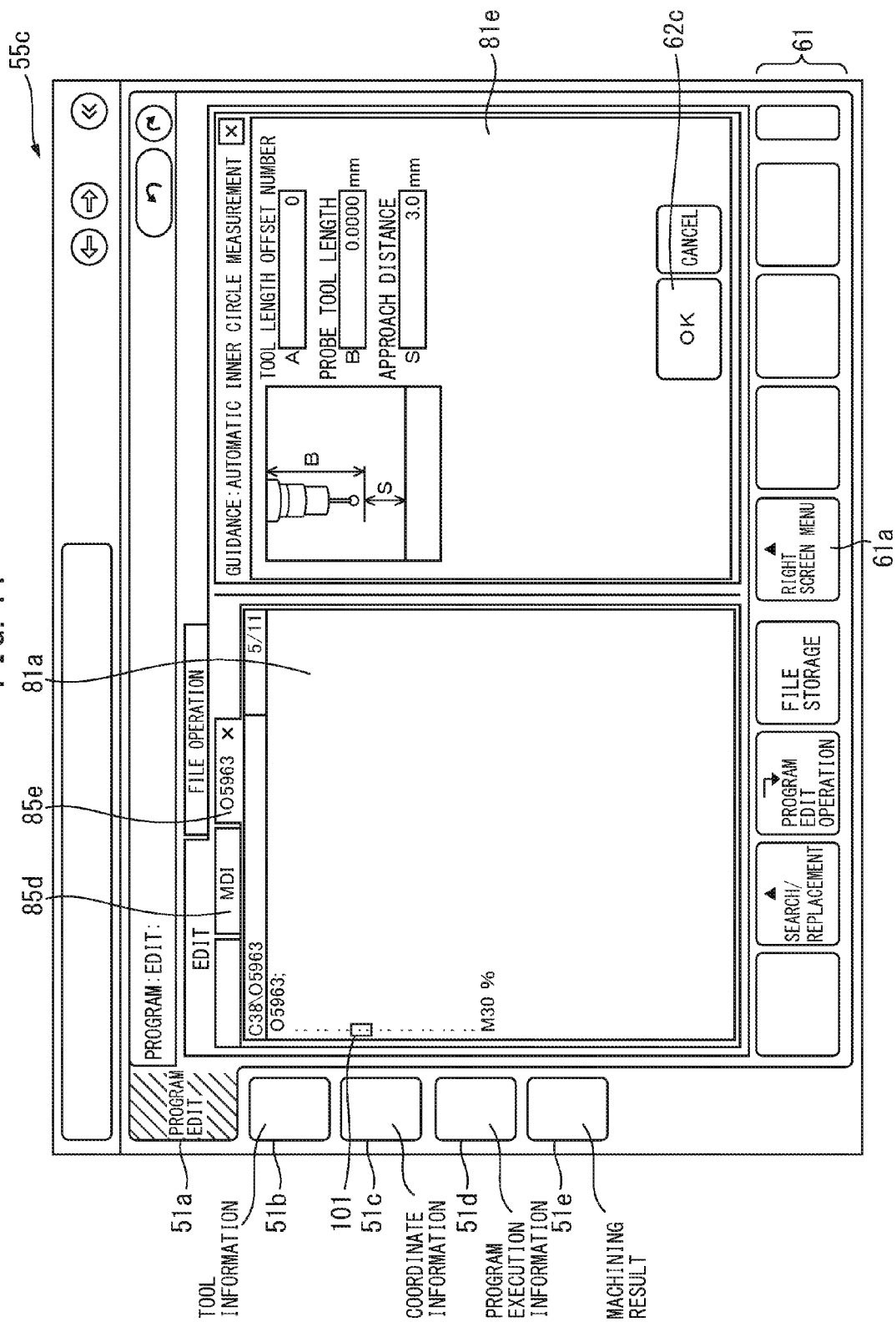
FIG. 11 is third screen of the third program edit screen displayed on the display panel.

FIG. 11 shows third screen of the third program edit screen according to the present embodiment. The image of a display area 81*e* is displayed by pressing the button 62*b* for an expansion setting. In the display area 81*e*, information on the argument which is possible to be omitted is displayed. For example, the tool length of a probe can be inputted on this screen. The operator can set the argument which is possible to be omitted as necessary. Next, by pressing a button 62*c* for establishing the input, the inputted argument is stored and the screen returns to the previous second screen.

Referring to FIG. 10, after the argument of the command code is inputted from the screen, a button 62*d* for inserting the machining program is pressed. This operation enables the command code for performing automatic measurement to be inserted into the position of the cursor 101 in the display area 81*a*.

Figure 12:
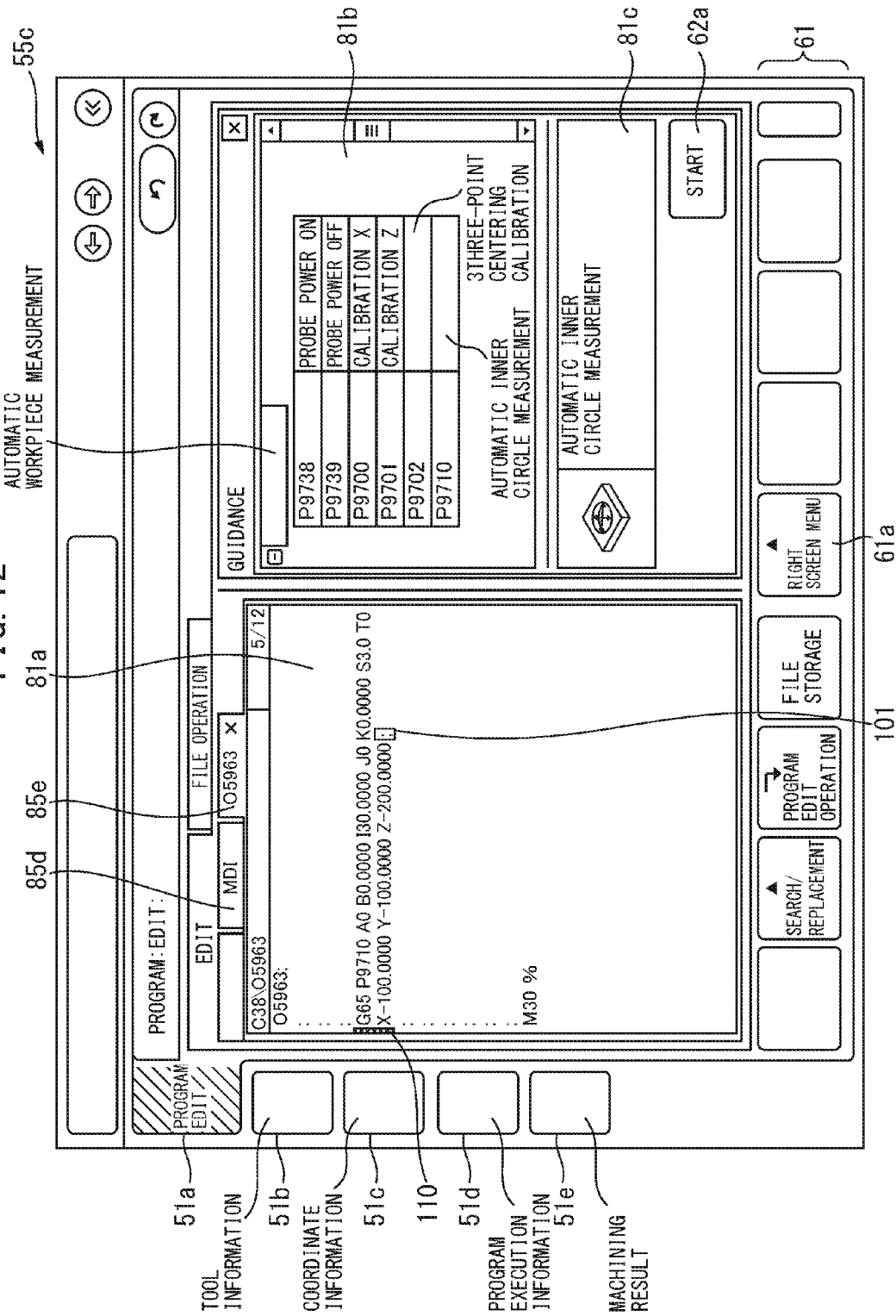
FIG. 12 is fourth screen of the third program edit screen displayed on the display panel.

FIG. 12 shows fourth screen of the third program edit screen according to the present embodiment. In the display area 81*a*, a machining program relating to a command code G65 for automatically performing measurement of the inner diameter of a circle is inputted.

Thus, the display control part 22 according to the present embodiment has a function of displaying the command code that is able to be selected and a function of displaying the screen that is able to input the information on the argument of the command code selected by the operator when creating the machining program on the program edit screen. The display control part 22 inputs the command code including the argument into the machining program by operating the button after the input of the argument by the operator is completed. The operator can input a desired command code according to the guidance displayed on the display panel 45 without referring to the operation manual or the like.

Further, on the screen relating to the argument of the command code, a screen for inputting the essential argument to be inputted and a screen for inputting the argument to be inputted optionally are formed so as to be individually displayable. Accordingly, the operator can easily determine the arguments which needs to be inputted and the arguments which is possible to be omitted. Input of the arguments which is possible to be omitted can be avoided, and an unskilled operator can create the command code with a small number of operation. In addition, the input errors of the command code can be reduced.

Note that the support function of the machining program can cause measurement conditions dependent on the tool to be stored as tool information. A necessary measurement condition can be obtained from the tool information when measurement is executed. When performing measurement of the tool or the like, the argument of the command code can be automatically inputted by reading the stored tool information. By this control, the number of operation performed by the operator can be reduced. In addition, a load on the operator when creating the program can be reduced, and the shape of the tool can be matched with the measurement condition.

Next, an auxiliary screen for setting a column width of the table displayed on the main screen or the auxiliary screen will be described. Information displayed on the main screen or the auxiliary screen may be displayed in a table form. For example, in the display area 81*b* illustrated in FIG. 9, a list of automatic measurement of workpiece is displayed in a table form. On the display panel 45 of the touch-panel type, when adjusting the column width of the cell of the table, movement is made while pushing the boundary line of adjacent columns by a finger. However, there is a case that it may be difficult to push the boundary line of the columns by the finger. For example, when the display panel 45 is pushed by the finger, a cell in the table may be selected without selecting a boundary line. When a touch pen or the like is used, there is a case that it may be difficult to arrange the tip of the touch pen on the boundary line.

The control apparatus according to the present embodiment is formed so that an auxiliary screen for adjusting the column width of the table is displayable. The column width of the table can be adjusted on the auxiliary screen. Such control can be performed by the display control part 22.

Figure 13:
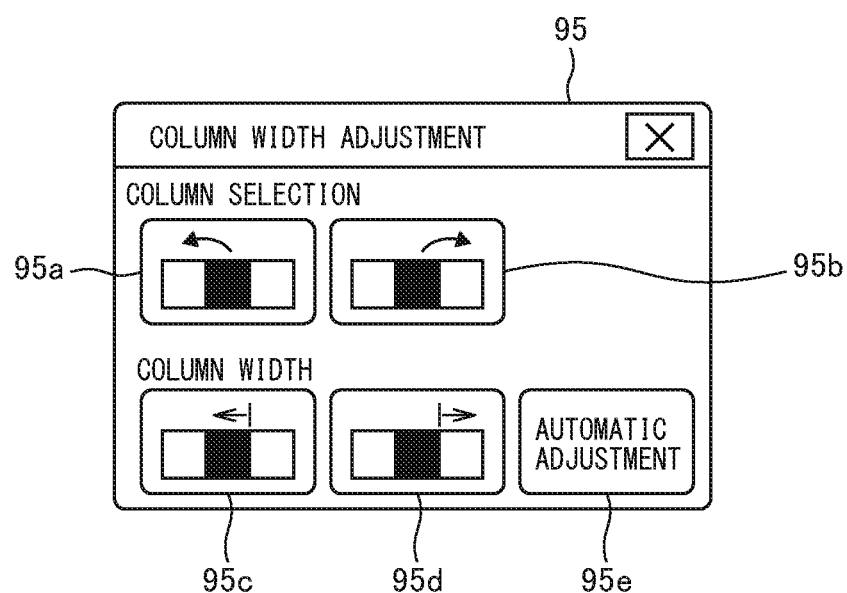
FIG. 13 is an auxiliary screen for setting a column width of a table displayed on the display panel.

FIG. 13 shows an auxiliary screen for setting a column width of the table according to the present embodiment. For example, the operator can display a selection screen by pressing the inside of a display area for a long time in which a predetermined table is displayed. An auxiliary screen 95 can be displayed by selecting an item of adjustment of the column width on this selection screen.

In the auxiliary screen 95, a column of which width to be changed can be selected by pressing a button 95*a* or a button 96*b*. The column width can be lengthened or shortened by pressing the button 95*c* or the button 95*d*. In other words, a selected column can be adjusted to an optional length. Alternatively, the column width can be automatically adjusted so as to display all the character strings of a desired column in a cell by pressing the button 95*e*. In other words, the column width can be adjusted corresponding to the longest character string. Thus, the column width of the image in the table form can be adjusted.

In the auxiliary screen 95 for changing the column width, the column width is adjusted by a button operation. Since the buttons 95*a* and 95*b* for selecting a column to be changed and buttons 95*c*, 95*d* and 95*e* for changing the column width are displayed large, the operator can easily press a desired button. In other words, the column width can be easily adjusted. In addition, all the character strings displayed in the selected column can be displayed by pressing the automatic adjustment button 95*e*.

Next, another form regarding the auxiliary screens displayed by being superimposed on each of the main screens will be described. In each main screen, information to be preferably displayed can be preset. For example, on the program edit screen, a program is displayed on the screen on the left side. In addition, desired information can be displayed in the display area on the right side by the right screen menu button arranged in the button area. However, there is a case that the operator desires to display yet another information. The control apparatus according to the present embodiment is formed so that the desired information can be displayed on the auxiliary screen on the basis of the operation of the operator. This control can be performed by the display control part 22.

Figure 14:
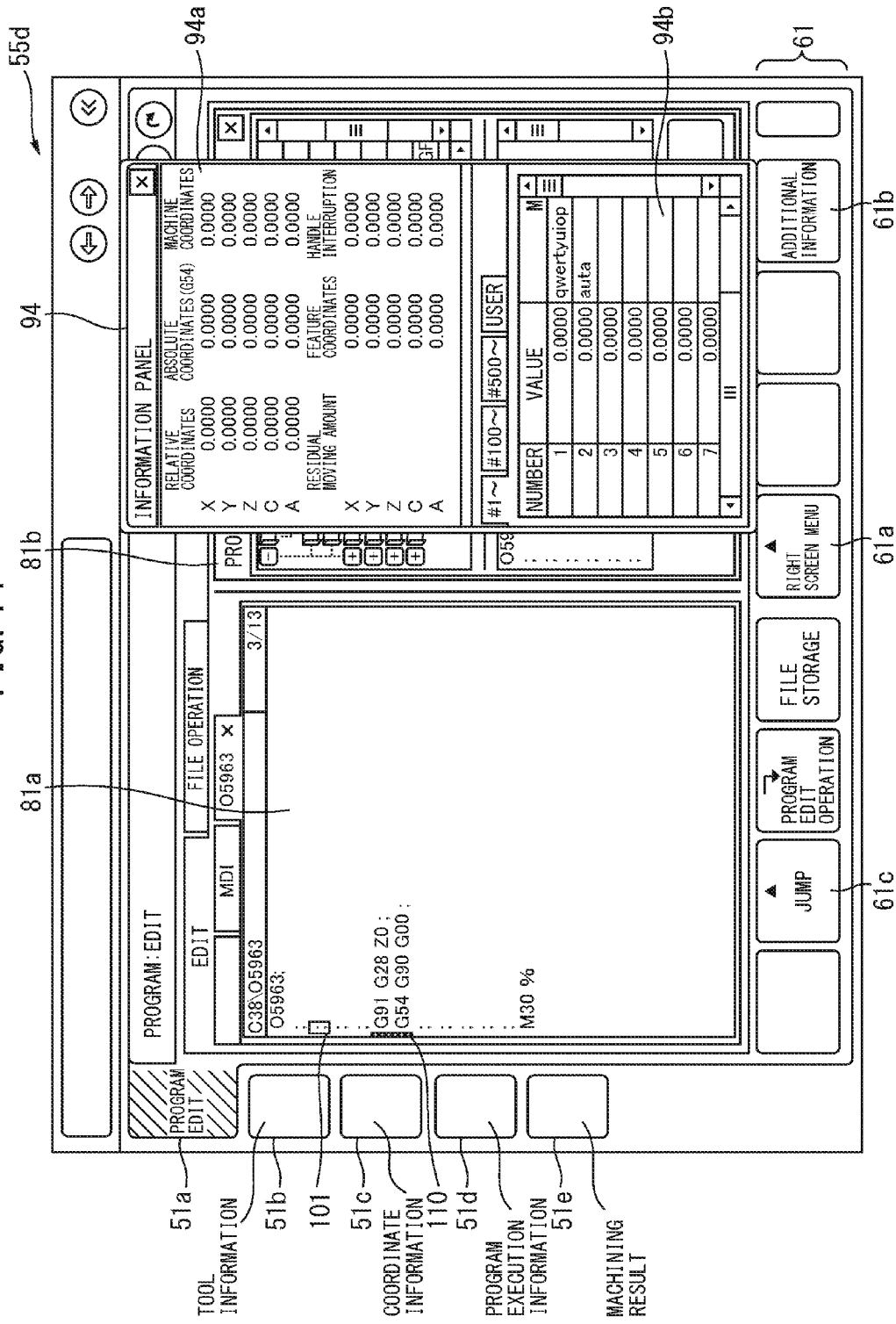
FIG. 14 is an auxiliary screen for displaying information desired by an operator.

FIG. 14 shows a screen for displaying an auxiliary screen including desired information on the main screen. In FIG. 14, the program edit screen is selected from among the main screens by pressing the selection part 51*a*. The operator can display an auxiliary screen 94 by pressing the button 61*b* for additional information in the button area 61. On the auxiliary screen 94, information relating to information displayed on the main screen can be displayed. On the auxiliary screen 94, a screen is divided into two, and display areas 94*a* and 94*b* are displayed. The auxiliary screen 94 is formed so that two types of information are displayable. The operator can create the program while confirming the information displayed on the auxiliary screen 94.

Information displayed on the auxiliary screen 94 can be preset. However, the information displayed on the auxiliary screen 94 varies depending on the type of machining, the state of the machine tool, the desired matter of the operator, and the like. The control apparatus according to the present embodiment is formed so that the operator can select information displayed on the auxiliary screen 94. Items that can be displayed in the display areas 94*a* and 94*b* are displayed by pressing the inside of the display areas 94*a* and 94*b* for a long time. Desired information can be displayed by selecting a predetermined item.

The type of information displayed on the auxiliary screen 94 can be stored in the storage part 26. The type of information displayed on the auxiliary screen 94 is stored in association with the type of a main screen. Information displayed corresponding to each main screen can be stored in the storage part 26. For example, on the tool information screen, information relating to the tool can be stored so as to be displayed on the auxiliary screen. Further, the information displayed on the auxiliary screen 94 can be stored in the storage part 26 in association with the operator. Thus, when the auxiliary screen 94 is displayed after the registration number or the like of the operator is inputted and the machine tool is activated, previously stored information can be displayed on each main screen.

When information other than what is currently displayed on the main screen is not necessary, the auxiliary screen 94 can be set to a non-display state. Thus, when displaying of the auxiliary screen 94 is not necessary, the auxiliary screen 94 is set to the non-display state, and the main screen can be widely displayed. In the example illustrated in FIG. 14, the auxiliary screen 94 is divided into two, and two types of information are displayed. The embodiment is not limited to this, but one type of information may be displayed, or three or more types of information may be displayed.

The information control part 20 has a function of calling up a program such as a machining program or a test program created in the past from the storage part 26 to edit the program. The operator can create a current program by editing a part of the past program. For example, the operator inserts a character string into a machining program created in the past or deletes a part of the character string. However, a high level of knowledge or determination is required in order to determine the influence of a changed part on other parts. Accordingly, when editing the past program, erroneous determination or confirmation omission may occur.

When calling up the program created in the past from the storage part and editing the program, the display control part 22 according to the present embodiment displays an edit mark 110 in the edited part of the program. Thus, the operator can easily confirm the edited part, and can suppress erroneous determination or conformation omission or the like at the time of creation of a machining program. When there are a plurality of edit marks 110, a function of moving to a next edit mark 110 is provided. According to the present embodiment, movement can be made to the next edit mark 110 by pressing the jump button 61c of the button area 61 and selecting a menu.

The display control part 22 deletes the edit mark 110 when the operator presses a button for deleting the edit mark 110. The display control part 22 is formed so as to automatically delete the edit mark 110 in addition to manual deletion of the edit mark 110. When a part of the program including the edited part is executed by the control apparatus, the display control part 22 deletes the edit mark 110. Alternatively, when the machining program is analyzed in the edit mode so as to check the presence of incompleteness of the program, the display control part 22 deletes the edit mark 110. When the edit of the machining program is finished and the screen for editing the machining program is closed, the display control part 22 deletes the edit mark 110. Thus, the edit mark may be automatically deleted under a preset condition. By this control, it is suppressed to forget to delete the edit mark. Alternatively, the number of operations performed by the operator can be reduced.

The control apparatus 70 according to the present embodiment is formed so as to display a warning message when the program is executed in the remaining state of the edit mark 110 in the program. The control apparatus is formed so as to notify the operator of the remaining of the edit mark. In the present embodiment, the edit mark is displayed at the beginning of a row in which the program is edited. The embodiment is not limited to this, but control for changing the color of a character of a changed part may be performed.

Figure 15:
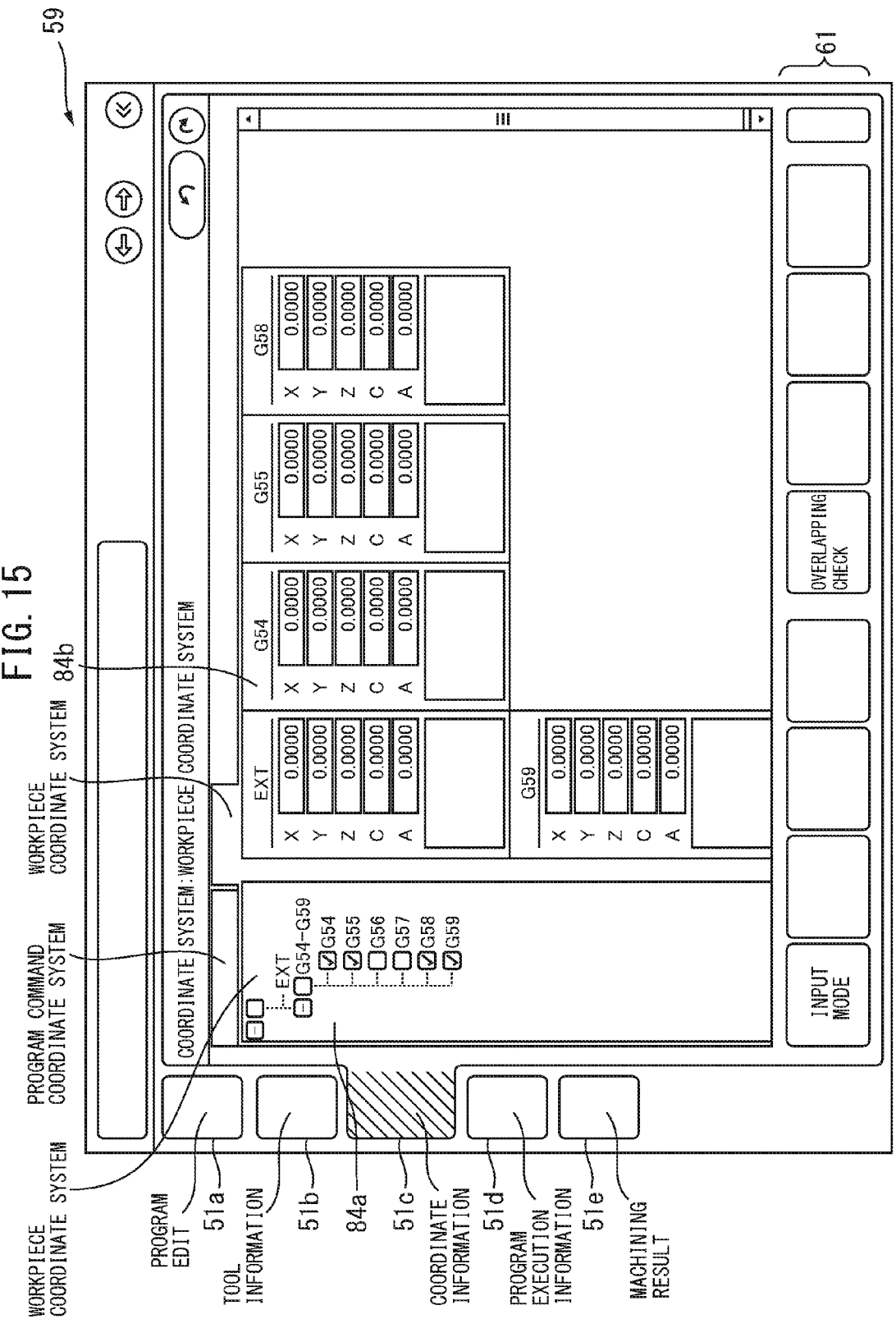
FIG. 15 is a coordinate information screen displayed on the display panel.

FIG. 15 shows a coordinate information screen according to the present embodiment. A coordinate information screen 59 can be displayed by selecting the selection part 51c. In the coordinate information screen 59 illustrated in FIG. 15, a workpiece coordinate system is selected from a program command coordinate system and the workpiece coordinate system. When the workpiece coordinate system is selected, a workpiece coordinate system stored in the storage part 26 can be displayed.

The coordinate information screen 59 includes a display area 84a and a display area 84b. In the display area 84a, all the workpiece coordinate systems that are stored in the storage part 26 can be displayed. In the display area 84a, a desired workpiece coordinate system can be selected from among a plurality of the workpiece coordinate systems. In the display area 84b, information on the workpiece coordinate system selected in the display area 84a is displayed or inputted.

Further, the coordinate system selected in the display area 84a can be stored in the storage part 26 in association with the operator who uses the machine tool. In other words, the coordinate system can be stored in association with a number or the like inputted at the time of activating the machine tool.

There is a case that multiple workpiece coordinate systems may be used in one machining program. Alternatively, multiple types of workpiece coordinate systems may be used depending on the type of processing and the type of a workpiece or the like. As a result, many workpiece coordinate systems are stored in the machine tool.

The workpiece coordinate systems can be named "G54" and "G55" or the like. When a plurality of workpiece coordinate systems are used for machining one workpiece, names are created by serial numbers, and thus the operator can easily select the number when performing the same processing at a later date. However, one workpiece coordinate system may be used for two types of machining or more, or a workpiece coordinate system may be added later. There is a case that it may be difficult to set a name of the workpiece coordinate systems by serial numbers for one machining. In addition, there is a problem that it takes time to find a workpiece coordinate system preferable for current processing from among the multiple workpiece coordinate systems.

In the control apparatus according to the present embodiment, in the coordinate information screen 59, the operator selects an optional coordinate system from among a plurality of coordinate systems stored in the storage part 26 and information on the selected coordinate system is formed so as to be displayable. The storage part 26 stores the coordinate system selected by the operator, and the display control part 22 displays the coordinate systems stored in the storage part 26 at the time of displaying the coordinate information screen. Accordingly, when the coordinate information screen is closed or the machine tool is reactivated, a previously stored workpiece coordinate system is displayed when the coordinate information screen 59 is displayed. By this control, the coordinate system that is necessary for machining can be easily displayed. Time and labor for finding a desired coordinate system from among the multiple coordinate systems can be omitted.

The abovementioned embodiments can be appropriately combined. In each of the above-described drawings, similar and equivalent portions are assigned similar reference signs. Note that the abovementioned embodiments are exemplary, and thus in no way limitative of the present invention. In the embodiments, changes of the embodiments described within the appended claims are included.

REFERENCE SIGNS LIST

1 machine tool
20 information control part
22 display control part
26 storage part
28 display part
29 manual input part
30 operation part
31 manual pulse generator
31a enable button
35 operation state detection part 41 operation panel
42 keyboard part
45 display panel
49*a*, 49*b*, 49*c*, 49*d* operation mode selection button
55*a*, 55*b*, 55*c*, 55*d* program edit screen
60 manual operation screen
70 control apparatus
71 input part
76 machining program
92, 93, 94 auxiliary screen
96 information display area
96*a*, 96*b* icon

The invention claimed is:

1. A control apparatus for a machine tool that machines a workpiece by moving a tool relative to the workpiece, the machine tool operating under a plurality of operation modes, the apparatus comprising:
    a display part that displays information relating to the machine tool;
    an operation panel for controlling the machine tool and including switches to select respective operation modes of the machine tool; and
    a manual pulse generator that transmits a pulse signal for manually driving the machine tool and includes a permission button that enables the pulse signal to be transmitted when the button is operated on,
    wherein the plurality of operation modes include a manual operation mode,
    the switches of the operation panel include a manual operation mode switch to select the manual operation mode, the selection of the manual operation mode by the manual operation mode switch resulting in displaying a manual operation screen on the display part,
    the display part is configured such that during the manual operation mode, an operation on the permission button of the manual pulse generator brings back the manual operation screen on the display part when the display part does not display the manual operation screen at the time of the operation on the permission button.

2. The control apparatus for the machine tool according to claim 1, wherein
    the plurality of operation modes include an edit mode that enables a machining program to be edited, and the switches of the operation panel include an edit mode switch to select the edit mode, and
    the display part is configured such that an operation on the edit mode switch brings up a program edit screen that enables the machining program to be edited.

3. The control apparatus for the machine tool according to claim 1, wherein
    the plurality of operation modes include a trial operation mode for inputting a test program and performing trial operation of the machine tool, and the switches of the operation panel include an trial operation mode switch to select the trial operation mode, and
    the display part is configured such that an operation on the trial operation mode switch brings up a trial operation screen that enables the test program to be edited.

4. The control apparatus for the machine tool according to claim 1, wherein
    an information display area for displaying a notification image notifying of the state of the machine tool is set at end part of a screen of the display part, and when the state of the machine tool matches a preset condition, the display part displays the notification image corresponding to the state of the machine tool in the information display area, and displays the information on the state of the machine tool when the operator selects the notification image.

* * * * *